United States Patent Office 3,234,712
Patented Feb. 15, 1966

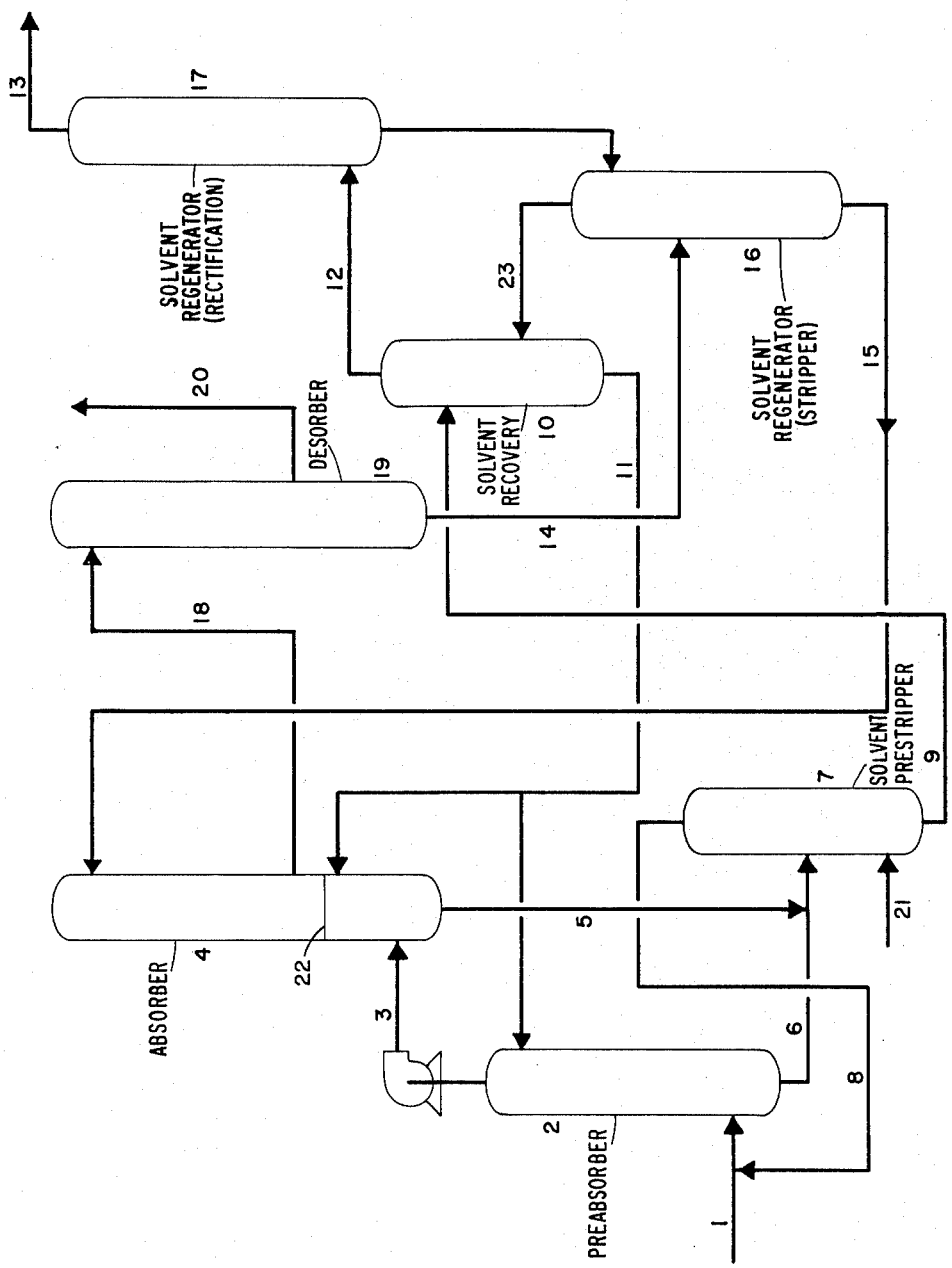

3,234,712
PURIFICATION OF ACETYLENE
Gordon H. Lovett and Walter H. Stanton, Texas City, Tex., assignors to Monsanto Company, a corporation of Delaware
Filed Aug. 22, 1961, Ser. No. 133,192
7 Claims. (Cl. 55—38)

This invention relates to a process for the purification of acetylene. More particularly, it relates to the treatment of an acetylene bearing gas stream to selectively absorb acetylenic compounds containing four or more carbon atoms and heavier hydrocarbons containing six or more carbon atoms from an acetylene-bearing gas stream and stripping these components form the absorbing medium.

The primary starting materials for the production of acetylene are obtained from petroleum and the lower boiling constituents thereof, namely, the normally gaseous hydrocarbons such as methane, ethane, or propane. The acetylene-producing reaction is promoted by elevated temperatures and is endothermic in nature. In some acetylene processes, part of the heat required to maintain the reaction is supplied by preheating the hydrocarbon feed and the remainder is provided by introducing heated oxygen into the reaction zone for combustion with a portion of the feed. As the result, the effluent gases from the reaction zone are contaminated with large quantities of combustion products, essentially a mixture of carbon monoxide, carbon dioxide, and water vapor.

In addition to the aforementioned compounds, the reaction product gas also contains unconverted hydrocarbon feed and large amounts of hydrogen. The relative quantities of the various components which make up the reaction products will vary depending on the feed material and the conditions under which the pyrolysis reaction is carried out. In general, however, hydrogen and the combustion gases are largest in quantity followed by acetylene, unconverted feed, acetylene homologs and other impurities. The thermodynamics and kinetics of the acetylene process are such that a number of higher acetylenes and other heavy components are produced. The more usual compounds formed along with acetylene and low boiling olefins, such as ethylene, in the order of their volatility are for example: allene, methylacetylene, butadiene, monovinylacetylene, biacetylene, benzene, toluene, triacetylene, vinylbiacetylene, phenylacetylene, indene, naphthalene, methyl naphthalene, and acenaphthylene. The possible uses of the gas of such a heterogenous nature are very few. Therefore, a large part of the acetylene plant is devoted to the handling and separation of the various gases mentioned.

In the purification of acetylene the usual steps provide for absorbing acetylene, higher acetylenes and other heavy components from the cracked gas stream by means of a selective solvent such as dimethylformamide, butyrolactone, N-methyl pyrrolidone, etc. A prestripping operation follows to separate carbon dioxide and acetylene. The desorption step then removes acetylene from the solvent. Finally the solvent is stripped of water and some of the higher acetylenes and other heavy components. Acetylenic compounds containing four or more carbon atoms and heavier hydrocarbons containing six or more carbon atoms are not effectively removed, and they concentrate in the circulating solvent, ultimately forming polymer. This polymer is partly removed by treating a portion of the circulating solvent. The remainder of the polymer is removed by cleaning the purification system. Removing the polymer thus formed is a costly operation. Polymer fouling of the acetylene purification system limits continuity of plant operation and is a very high maintenance cost item.

It is, therefore, the object of this invention to provide an improved process for the purification of acetylene. Another object of the invention is to provide an efficient and adequate means for absorbing acetylenic compounds having four or more carbon atoms and heavier hydrocarbons containing six or more carbon atoms from the cracked gas stream and removing them as vapors from the acetylene purification solvent. Other objects will become apparent from the following description of the invention.

According to this invention acetylenic compounds having four or more carbon atoms and heavier hydrocarbons containing six or more carbon atoms, present as undesirable impurities in the acetylene-bearing gas stream produced by a pyrolysis reaction, are substantially removed from the acetylene-bearing cracked gas stream prior to the absorption and purification of the acetylene in a solvent absorption-desorption purification system by the combination of selective absorption of the said acetylenic compounds and heavier hydrocarbons with about one-tenth the amount of an acetylene solvent used in the solvent absorption-desorption acetylene purification system, and subsequent stripping of the absorbed compounds from the said solvent with vapor from the main solvent regeneration column of the solvent absorption-desorption acetylene purification system.

Preabsorption of high boilers is well known and commonly used in the purification of acetylene. This invention, however, is concerned with a combination operation of absorbing acetylenic compounds having four or more carbon atoms and heavier hydrocarbons having six or more carbon atoms and then stripping these compounds to remove them as vapor from the purification system by using the overhead vapor from the main solvent regenerator column which, because of the high water content, tends to reduce hydrogen bonding between the solvent and the acetylene compounds and heavier hydrocarbons and thus accomplishes effective stripping.

The process of this invention is illustrated by the flow diagram of FIGURE 1. Cool, soot-free cracked gas 1, containing acetylene enters the preabsorber 2. Some selective acetylene solvent such as N-methyl pyrrolidone is introduced into the preabsorber to absorb acetylenic compounds having four or more carbon atoms and heavier hydrocarbons having six or more carbon atoms from the cracked gas stream. The rich solvent leaves the bottom of the preabsorber column via line 6 where it is then fed to the solvent prestripper 7, to remove any acetylene which has been absorbed with the heavy components by means of a stripping gas entering via line 21. This acetylene is recycled via line 8 to the cracked gas feed stream which enters the preabsorber. The cracked gas rich in acetylene and lighter components leaves the top of the preabsorber 2, is compressed, and passes through line 3, into the bottom of the main absorber 4. A small stream of solvent enters the absorber, 4, through line 11 and removes any of the higher acetylenes which were not removed in the preabsorber 2. This solvent is kept separate from the components in the top of the column by perforated partition 22 which allows vapor to rise through the tray but directs the descending liquid through downcomers into line 18 to desorber 19 rather than to the next lower tray in absorber 4. This stream of solvent and absorbed acetylenic compounds and heavy hydrocarbons 5, also enters the prestripper 7, for acetylene removal. The solvent and said acetylenic compounds and heavy hydrocarbons leave the prestripper 7 via line 9 and enter the solvent recovery column 10, where the solvent is stripped with the water vapor stream through line 23 from the stripper section of the main solvent regenerator 16. The said acetylenic compouds and heavy hydrocarbons are stripped from the solvent and pass overhead through line 12, to the rectification section of the main solvent regenerator 17. Nearly all of the said acetylenic compounds and heavy hydrocarbons leave the system through the overhead line 13, from the rectification section of the main solvent regenerator 17. The regenerated solvent 11, leaving the solvent recovery column 10, is returned to the absorber 4, and the preabsorber 2, for subsequent use. Although the solvent used in this process may be the same as the main solvent stream in the purification of acetylene, it is completely separated from the main solvent and has no contact other than the use of main solvent regenerator vapor to strip the said acetylenic compounds and heavy hydrocarbons from the solvent. The main acetylene stream is absorbed in the absorber 4, by a solvent from the stripper section of the main solvent regenerator 16 through line 15 and is introduced into the desorber column 19, via line 18. Product acetylene is taken off the middle of the desorber column 19, by line 20 to storage. The principle solvent stream leaves the desorber column through line 14 and enters the top of the main solvent regenerator 16, where the impurities are removed. Purified solvent leaves the main solvent regenerator via line 15 for reuse in the absorber column 4.

The following examples will more fully illustrate the invention but are not to be construed as limiting it in any manner whatsoever.

*Example I*

Cracked gas from the acetylene converter containing 480 mols of acetylene, 10 mols of methylacetylene, allene, butadiene and monovinylacetylene, 270 mols of water vapor, 26 mols of acetylenic compounds having four or more carbon atoms and heavier hydrocarbons having six or more carbon atoms with the remaining 4,500 mols being unsaturated feed gases or light combustion products, enters the preabsorber column at about 5 p.s.i.a. and 40° C. About one thousand mols of N-methyl pyrrolidone-water mixture or approximately one-tenth the amount of solvent to the main acetylene absorber enters the top of the preabsorber and leaves the bottom of the column after absorbing 100 mols of water and approximately 10 mols of said acetylenic compounds and heavy hydrocarbons leave the top of the preabsorber column with the light gases in the rich acetylene stream. After compression to approximately 125 p.s.i.a., 14 mols of the remaining acetylenic compounds and heavy hydrocarbons are absorbed in the main absorber column by a solvent stream of approximately 500 mols at about 40° C. and join the solvent stream from the bottom of the preabsorber to enter the top of the prestripper column. Approximately 19 mols of acetylene which was absorbed along with acetylenic compounds and heavy hydrocarbons is stripped in this prestripper column and sent back to the preabsorber feed. The solvent stream composed of 1000 mols of N-methyl pyrrolidone, 500 mols of water vapor and approximately 24 mols of said acetylenic compounds and heavy hydrocarbons leave the bottom of the prestripper and enter the solvent regenerator column. Water vapor from the main solvent regenerator column strips approximately 22.5 mols of the said acetylenic compounds and heavy hydrocarbons from the solvent stream. These compounds are then eliminated from the system through the rectification section of the main solvent regenerator column. This is greater than a 90% removal per pass of all acetylenic compounds containing four or more carbon atoms and heavier hydrocarbons containing six or more carbon atoms. Purified solvent from the regenerator column is then recycled to the absorber and preabsorber for subsequent reuse. The individual compounds making up the group called acetylenic compounds containing four or more carbon atoms are for example: biacetylene, vinylbiacetylene, triacetylene, and phenylacetylene; the group called the heavier hydrocarbons having six or more carbon atoms are for example: benzene, toluene, indene, naphthalene, methyl naphthalene and acenaphthylene.

*Example II*

Using the same equipment as Example I with the exception of the bottom section of the absorber column and the prestripper, approximately 75% of the total acetylenic compounds having four or more carbon atoms and heavier hydrocarbons having six or more hydrocarbons absorbed in Example I are removed from the cracked gas stream by means of a solvent in the preabsorber column. Approximately one-fifteenth the amount of acetylene solvent is used as is used in the main acetylene absorber. Under the same feed conditions as in Example I, this alternate method results in the loss of approximately 20 mols of acetylene which were recovered in Example I. The said acetylenic compounds and heavy hydrocarbons are stripped from the solvent in the solvent regenerator column and eliminated from the system in exactly the same manner as Example I with the purified solvent from the bottom of the column being recirculated to the preabsorber for further use.

It can readily be seen from the above examples that by means of this absorption-stripping technique approximately 65 to 95% of the acetylenic compounds having four or more carbon atoms and heavier hydrocarbons having six or more carbon atoms can be removed from the acetylene purification system thus eliminating the effect of these components. As a result of absorbing these polymer-forming materials from the cracked gas stream prior to its entering the main purification system, polymer formation in the main purification system is greatly minimized. In addition, the polymer-formers are confined to a small prescrub system which is designed to strip the polymer-formers before they polymerize. Since these acetylenic comupounds containing four or more carbon atoms are very reactive, they must be removed from the system within a short time after their formation or they will polymerize.

The principle of separation of higher acetylenes, for instance, from acetylene, upon which this invention is based is the variation of the strength of the hydrogen bond with temperature and water dilution. For example, biacetylene because of its strong affinity for acetylene solvents has only 6% of its pure state vapor pressure at 40° C. when diluted in an acetylene solvent and held at 40° C. As temperature increases, this bonding tendency is reduced. At 100° C. the effective vapor pressure of biacetylene diluted in an acetylene solvent is 10 times that at 50° C. and 20% of its vapor pressure in the pure state.

Water dilution also decreases the bonding strength. At 50° C. the vapor pressure of biacetylene diluted in an acetylene solvent which is 30 mol percent water is about 20% of the vapor pressure of biacetylene in the pure state. At 100° C. in a 30 mol percent water –70 mol percent acetylene solvent, the vapor pressure of biacetylene is 50% of that in a pure state. The range of water dilution required in the solvent used in this invention is from about 10 mol percent to about 40 mol percent.

Another factor important in this separation of acetylenic compounds having four or more carbon atoms and heavier hydrocarbons having six or more carbon atoms from the solvent used to absorb them is the vapor to liquid ratios in the stripping column. By the method of this invention whereby the solvent used to absorb said acetylenic compounds and heavy hydrocarbons from the acetylenic gas stream is maintained in a separate system from that of the main acetylene purification system, the solvent required is very small. Only from about 5% to about 15% of the amount required for acetylene absorption is needed in the practice of this invention. Consequently the relatively small amount of solvent can be stripped from the said acetylenic compounds and heavy hydrocarbons with comparative ease with the large amount of vapor from the main solvent regenerator. To assure the adequacy of the vapor in this invention for stripping, the vapor to liquid ratio in the stripping column must be from about 0.3 to about 3.0. In addition, the stripping vapor must be very high in water content to more easily break the bonding between the solvent and the said acetylenic compounds and heavy hydrocarbons. This water content of the stripping vapor should be in the range from about 80 mol percent to about 99 mol percent for the best results.

Therefore, the elimination of these polymer formers and other impurities from the acetylene gas stream, that is, acetylenic compounds having four or more carbon atoms and heavier hydrocarbons having six or more carbon atoms, is accomplished according to this invention by stripping from the absorbing solvent because of the high water content of the solvent during the stripping process, using a sufficiently high temperature to reduce bonding strength, and at a high vapor to liquid ratio. More specifically, the compounds which are substantially removed by the combination absorption and solvent stripping in this invention are biacetylene, benzene, toluene, vinylbiacetylene, triacetylene, indene, naphthalene, phenylacetylene, methyl naphthalene and acenaphthylene.

This process has been concerned with the removal of small amounts of impurities from a very dilute acetylene-bearing cracked gas stream. The examples teach that one can utilize this invention to remove these acetylenic compounds having four or more carbon atoms and heavier hydrocarbons having six or more carbon atoms from the acetylene-bearing gas stream immediately after the pyrolysis reaction or after the gas stream has been pressured to about 100 to 200 p.s.i.a. It is apparent, therefore, that the scope of this invention includes absorption of these components at either the outlet of the acetylene converter at low pressure or just prior to their entry at a higher pressure into the purification system although its preferable to remove a portion of the said acetylenic compounds and heavy hydrocarbons at both of these process locations.

It is also apparent from the examples that this process may be operated over a wide range of pressure. The said acetylenic compounds and heavy hydrocarbons can be absorbed as previously mentioned at pressures from atmospheric to about 200 p.s.i.a. However, the prestripping of acetylene and the stripping of the said acetylenic compounds and heavy hydrocarbons must be carried out at from about 1 p.s.i.a to not more than about 30 p.s.i.a. and preferably at from 3 p.s.i.a. to about 15 p.s.i.a The temperature under which the absorption and stripping operations are carried out in the examples is approximately 40° C. and 100° C. respectively. However, all the steps in the process of this invention can be accomplished with a temperature of from about 0° C. to about 200° C. without departing from the scope of this invention. Low temperatures do not result in the proper stripping of the acetylenic compounds having four or more carbon atoms and heavier hydrocarbons having six or more carbon atoms from the solvent and high temperatures tend to volatilize the solvent. Therefore, the preferred temperatures for the stripping step are from about 80° C. to about 200° C. and for the absorption step are from about 0° C. to about 100° C.

It is obvious from the previous description of the invention that any common acetylene solvent can be used as the absorbing solvent for the said acetylenic compounds and heavy hydrocarbons. However, the more effective acetylene solvents such as dimethylformamide, butyrolactone, or N-methyl pyrrolidone are preferred because of their efficiency, physical characteristics, and cost.

One very significant factor of this invention is the separate solvent system employed in the absorption and stripping of the said acetylenic compounds and heavy hydrocarbons. This frees the main solvent system used in the purification of acetylene of these polymer forming compounds.

The principal advantage of this invention can readily be seen by the fact that these impurities which are very difficult to remove from acetylene by any conventional purification are now easily removed by absorbing them from the acetylene-bearing cracked gas stream prior to the absorption of the acetylene itself in the main acetylene purification system and subsequently stripping these acetylenic compounds having four or more carbon atoms and heavier hydrocarbons having six or more carbon atoms from the separate solvent system with the use of vapor from the acetylene purification system to eliminate them from the system.

What is claimed is:

1. In a process for removing acetylene from a gas stream containing the same, water and acetylenic compounds of at least 4 carbon atoms and heavier hydrocarbons of at least 6 carbon atoms produced by a pyrolysis reaction, which process comprises:

contacting said gas stream with an acetylene-free aqueous absorbent for said acetylenic compounds of at least 4 carbon atoms and heavier hydrocarbons of at least 6 carbon atoms in a first absorption zone to absorb the same from said gas stream, said aqueous absorbent containing 10–40 mol percent water, separating the resulting absorbent rich in said acetylenic compounds of at least 4 carbon atoms and heavier hydrocarbons of at least 6 carbon atoms from the resulting gas stream, contacting the latter gas stream with an absorbent for acetylene in a second absorption zone to absorb the same and water, separating the resulting acetylene-rich absorbent containing water from the resulting acetylene-free gas stream, desorbing said acetylene from said acetylene-rich absorbent to obtain acetylene and the resulting acetylene-lean absorbent containing water, stripping said acetylene-lean absorbent in a first stripping zone to obtain an absorbent free of acetylene and a vapor stream containing water, recycling said absorbent free of acetylene to said second absorption zone, stripping said absorbent rich in acetylenic compounds of at least 4 carbon atoms and heavier hydrocarbons of at least 6 carbon atoms in a second stripping zone with said vapor stream containing water obtained in said first stripping zone to obtain absorbent free of said acetylenic compounds of at least 4 carbon atoms and heavier hydrocarbons of at least 6 carbon atoms, and recycling the latter absorbent to said first absorption zone.

2. The process of claim 1 wherein said absorbent for said acetylenic compounds of at least 4 carbon atoms and heavier hydrocarbons of at least 6 carbon atoms is the same as said absorbent for acetylene.

3. The process of claim 2 wherein said absorbent for said acetylenic compounds of at least 4 carbon atoms and heavier hydrocarbons of at least 6 carbon atoms is selected from the group consisting of dimethylformamide, butyrolactone, and N-methyl pyrrolidone.

4. The process of claim 3 wherein said absorbent is N-methyl pyrrolidone.

5. The process of claim 1 wherein the temperature is from about 0 to about 100° C. and the pressure is from about 0 to about 200 p.s.i.a in said first absorption zone and the temperature is from about 80 to 200° C. and the pressure is from about 1 to 30 p.s.i.a in said second stripping zone.

6. The process of claim 1 wherein said vapor stream containing water obtained in said first stripping zone contains from 80 to 99 mol percent water.

7. The process of claim 1 wherein the ratio of vapor to liquid in said second stripping zone is in the range from 0.3 to 3.0.

References Cited by the Examiner

UNITED STATES PATENTS

| | | | |
|---|---|---|---|
| 2,719,601 | 10/1955 | Bartholome et al. | 55—64 X |
| 2,753,012 | 7/1956 | Thodos et al. | 55—65 X |
| 2,868,327 | 1/1959 | Rolzler et al. | 55—64 X |
| 2,870,867 | 1/1959 | Bartholome et al. | 55—65 X |
| 2,891,633 | 6/1959 | Morro et al. | 55—65 X |
| 2,911,067 | 11/1959 | Bludworth et al. | 55—64 X |
| 2,943,703 | 7/1960 | Thayer | 55—65 X |
| 2,993,566 | 7/1961 | Griffin | 55—65 X |
| 2,996,142 | 8/1961 | Worley | 55—31 |
| 3,023,843 | 3/1962 | Grubb et al. | 55—64 X |

REUBEN FRIEDMAN, *Primary Examiner.*

B. NOZICK, *Assistant Examiner.*